United States Patent [19]

Wright

[11] Patent Number: 5,239,750
[45] Date of Patent: Aug. 31, 1993

[54] HYDRAULIC SEAL AND METHOD OF ASSEMBLING THE SAME

[75] Inventor: William B. Wright, Derby, England

[73] Assignee: Rolls-Royce plc, London, England

[21] Appl. No.: 869,505

[22] Filed: Apr. 16, 1992

[30] Foreign Application Priority Data

Jun. 15, 1991 [GB] United Kingdom ............... 9112990

[51] Int. Cl.$^5$ .................... B23P 11/02; F16J 15/16
[52] U.S. Cl. .................... 29/888.3; 29/451;
       277/13; 277/14 R; 277/25; 277/53; 277/135
[58] Field of Search .............. 277/13, 14 R, 14 U,
       277/25, 53, 55, 56, 135, 178, 9; 29/888.3, 450, 451

[56] References Cited

U.S. PATENT DOCUMENTS

| | | | |
|---|---|---|---|
| 1,626,237 | 4/1927 | Hodgkinson | 277/53 |
| 2,407,285 | 9/1946 | King | 277/14 |
| 2,834,618 | 5/1958 | Wiltse | 277/14 |
| 3,097,853 | 7/1963 | McHugh | 277/135 |
| 3,455,561 | 7/1969 | Rinker et al. | 277/13 |
| 4,054,293 | 10/1977 | Hoeg et al. | 277/135 |
| 4,126,316 | 11/1978 | Cather, Jr. | 277/9 |
| 4,484,752 | 11/1984 | Bentley | 277/25 |
| 4,560,172 | 12/1985 | Zimmermann et al. | |

FOREIGN PATENT DOCUMENTS

| | | |
|---|---|---|
| 0126232 | 11/1984 | European Pat. Off. . |
| 0195433 | 4/1923 | United Kingdom ............... 277/53 |
| 242145 | 11/1925 | United Kingdom . |
| 1565018 | 4/1980 | United Kingdom . |
| 2125118 | 2/1984 | United Kingdom . |

Primary Examiner—William A. Cuchlinski, Jr.
Assistant Examiner—D. DePumpo
Attorney, Agent, or Firm—Oliff & Berridge

[57] ABSTRACT

A hydraulic seal is formed in the annular space 16 between two coaxial drive shafts 12 and 14. The seal is assembled with the two shafts in situ. An annular resilient seal member 30, which has an outer diameter which is larger than the inner diameter of the outer shaft 12, is deformed so that it can be passed through the annular space 16. The resilient seal member 30 is positioned in a channel 18 in the inner surface of the outer shaft 12. Once in the channel 18 the resilient seal member 30 returns to its original shape. The resilient seal member 30 is located between a pair of annular flanges 22 and 26 on the end of a pair of elongate members 20 and 24 of annular cross-section. The resilient seal member 30 protrudes into the channel 18 so that in operation it is partially immersed in a fluid 32 in the channel 18 to form the hydraulic seal.

6 Claims, 1 Drawing Sheet

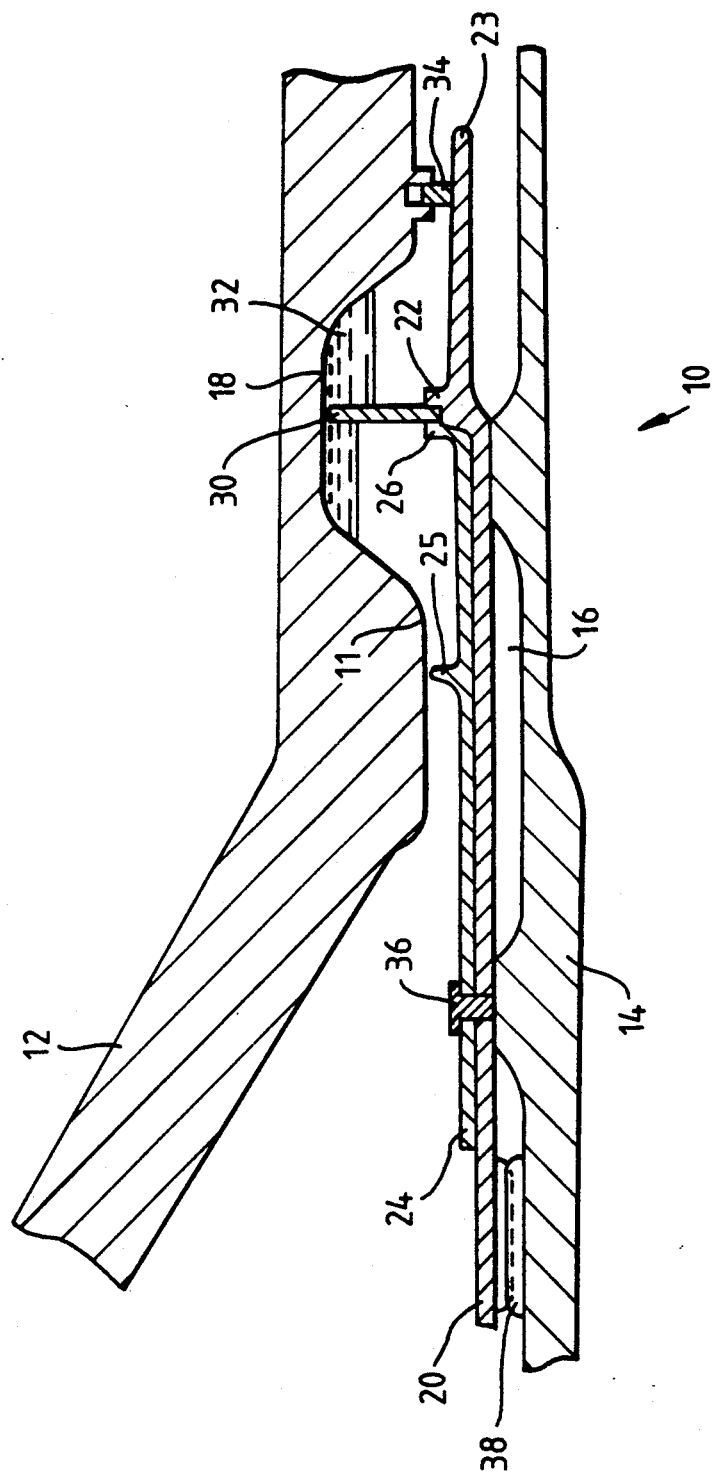

HYDRAULIC SEAL AND METHOD OF ASSEMBLING THE SAME

The present invention relates to hydraulic seals and in particular to hydraulic seals between two relatively rotatable components.

Hydraulic seals are used where it is undesirable to permit any air to traverse the seal. Hydraulic seals are formed by partially immersing a seal member in an annulus of fluid which is created by centrifugal forces. Any difference in air pressure on either side of the seal member is compensated for by a difference in the fluid level on either side of the seal member.

Hydraulic seals are often used between two relatively rotatable shafts. A problem with intershaft hydraulic seals is that when the seals have to be assembled, the seal member often has to be inserted through a restricted space between the shafts.

The present invention seeks to provide an improved method of assembling a hydraulic seal between two components, at least one of which is rotatable, when the space between the components is restricted.

According to the present invention a hydraulic seal between an inner and outer annular component, at least the outer annular component being rotatable, the outer annular component being positioned coaxially around the inner annular component to define an annular space therebetween, the outer annular component having a channel in its radially inner surface which in operation contains a fluid, the hydraulic seal comprises a first and a second elongate member of annular cross-section, each elongate member having a flange at one end thereof, the elongate members extend through the annular space between the inner and outer annular components so that the flanges are adjacent the channel in the radially inner surface of the annular outer component, there being an annular resilient seal member located between the flanges, the annular resilient seal member having an outer diameter which is larger than the annular space defined between the outer annular component and the inner annular component so that it extends into the channel in the radially inner surface of the outer annular component and in operation is partially immersed in the fluid contained in the channel.

Preferably the resilient seal member is a thin sheet metal ring.

The first and second elongate members of annular cross-section may be fastened together by rivets to locate the annular resilient seal member permanently therebetween. The elongate members of annular cross-section may also be connected to the inner annular component to maintain the hydraulic seal in position.

Preferably sealing means are provided on at least one side of the channel in the radially inner surface of the outer annular member to prevent the fluid leaking from the vicinity of the channel when neither the inner nor the outer annular components are rotating. In one embodiment of the present invention at least one of the elongate members of annular cross-section is provided with the sealing means to prevent the fluid leaking from the vicinity of the channel in the radially inner surface of the outer annular member when neither the inner nor the outer annular components are rotating.

The present invention also provides a method of assembling a hydraulic seal between an inner and an outer annular component, at least the outer annular component being rotatable, the outer annular component being positioned coaxially around the inner annular component to define an annular space therebetween, the outer annular component having a channel in its radially inner surface which in operation contains a fluid, the method of assembling the hydraulic seal comprises the steps of, inserting a first elongate member, of annular cross section and having a flange at one end thereof, into the space between the inner and outer annular components until the flange is adjacent the channel in the radially inner surface of the outer annular component, deforming an annular resilient seal member the outer diameter of which is larger than the annular space defined between the outer annular component and the inner annular component, inserting the deformed annular resilient seal member into the annular space defined between the inner and outer annular components until it abuts the flange of the first elongate member, allowing the annular resilient seal member to return to its original shape so that it protrudes into the channel in the radially inner surface of the outer annular component so that in operation the annular resilient seal member is partially immersed in the fluid in the channel, inserting a second elongate member of annular cross-section and having a flange at one end thereof until the flange abuts the annular resilient seal member, and fastening the first and second elongate members together to locate the resilient member therebetween.

BRIEF DESCRIPTION OF THE DRAWING

The present invention will now be described with reference to the accompanying drawing. The drawing shows an axially cross-sectional part view of two concentrically mounted shafts having a hydraulic seal, in accordance with the present invention, therebetween.

Referring to the drawing a hydraulic seal, between two components capable of relative rotational movement, is generally indicated at 10. The two components are annular and form an outer rotor drive shaft 12 and an inner rotor drive shaft 14. The two shafts 12 and 14 are arranged coaxially to define an annular space 16 therebetween. The radially inner surface 11 of the outer shaft 12 has a channel 18 therein, which in operation is filled with a fluid such as oil.

Two elongate members 20 and 24, of annular cross-section, extend through the annular space 16. Each of the elongate members 20 and 24 has a flange 22 and 26 respectively, at one end thereof. The elongate members 20 and 24 extend through the annular space 16 between the shafts 12 and 14 so that their flanges 22 and 26 are adjacent the channel 18. An annular resilient seal member 30 is located between the flanges 22 and 26. The flanges 22 and 26 of the first and second elongate members 20 and 24 are in abutting relationship with the resilient seal member 30 and are fastened together to locate the seal member 30 therebetween.

The resilient seal member 30 has an outer diameter which is larger than the inner diameter of the outer shaft 12 so that it protrudes into the channel 18. In the preferred embodiment of the present invention the resilient seal member 30 is a thin annular sheet metal ring. It will however be appreciated that the resilient seal member 30 could be a split metal ring or a ring made from other deformable materials such as rubber. The material chosen will depend on the particular application in which the hydraulic seal is to be used.

In operation an injector (not shown) discharges oil into the vicinity of the channel 18. A protrusion 25 on the second elongate member 24 extends radially towards the outer shaft 12 and acts to meter the amount of oil in the vicinity of the channel 18. Centrifugal forces act on the oil so that it forms an annulus. The annulus of oil 32 formed by the centrifugal forces fills the channel 18. The resilient seal member 30 extends into the annulus of oil 32 in the channel 18 to form the hydraulic seal. The oil 32 prevents any air passing through the seal and any difference in air pressure either side of the resilient seal member 30 is compensated for by a difference in the oil level either side of the seal.

When the shafts 12 and 14 are not rotating there are no centrifugal forces acting on the oil. The oil is prevented from leaking away from one side of the channel 18 by the provision of a seal 34. In the preferred embodiment of the present invention the first elongate member 20 is extended past the flange 22 to provide a surface 23 against which a piston seal 34, which is mounted from the outer shaft 12, locates. In normal operation when the shafts 12 and 14 are rotating the seal 34 is flung outwards under centrifugal forces. The seal 34 is spring loaded so that when the shafts are not rotating the spring urges the seal 34 against the surface 23. The oil collects at the bottom of the outer shaft 12 and drains freely away into a scavenge system.

Although in the preferred embodiment only one piston seal 34 is used it will be appreciated that any combination of seals could be used on either side of the chamber 18 to prevent leakage of the oil.

The seal is assembled with the two shafts 12 and 14 in situ. The first elongate member 20 is inserted through the annular space 16 between the shafts 12 and 14 so that its flange 22 is adjacent the chamber 18. The resilient seal member 30 is then deformed so that it can be inserted through the annular space 16 between the shafts 12 and 14. The seal member 30 is inserted until it abuts the flange 22 of the first elongate member 20 and is located in the chamber 18. The seal member 30 is resilient and once it is in the channel 18 it returns to its original shape. The seal member 30 protrudes into the channel 18 on regaining its original shape.

The second elongate member 24 is then inserted through the annular space 16 between the shafts 12 and 14 until its flange 26 abuts the seal member 30. The first and second elongate members, 20 and 24 respectively, are then fastened together, for example by rivets 36, to locate the seal member 30 permanently therebetween and maintain its position in the channel 18.

The first elongate member 20 is provided with splines 38 to connect it to the inner drive shaft 14 so that the seal is maintained in position.

The present invention has been described with reference to two rotatable shafts, 12 and 14, which rotate in the same direction at either the same speed or at different speeds. Although the present invention has been described with reference to two rotatable shafts 12 and 14 it will be appreciated by one skilled in the art that it is equally applicable to arrangements in which the inner shaft may be stationary.

I claim:

1. A method of assembling a hydraulic seal between an inner and an outer annular component, at least the outer annular component being rotatable, the outer annular component being positioned coaxially around the inner annular component to define an annular space therebetween, there being provided a channel in the radially inner surface of the annular outer component which in operation contains a fluid, the method of assembling the hydraulic seal comprising the steps of, inserting a first elongate member, having an annular cross-section and a flange at one end thereof, into the annular space defined between the inner and outer annular components until the flange is adjacent the channel in the radially inner surface of the annular outer component, deforming an annular resilient seal member the outer diameter of which is larger than the annular space defined between the outer annular component and the inner annular component, inserting the deformed annular resilient seal member into the annular space between the inner and outer annular components until it abuts the flange of the first elongate member, allowing the annular resilient seal member to return to its original shape so that it protrudes into the channel in the radially inner surface of the outer annular component, so that in operation the annular resilient seal member is partially immersed in the fluid in the channel, inserting a second elongate member, having an annular cross-section and a flange at one end thereof until the flange abuts the annular resilient seal member, and fastening the first and second elongate members together to locate the annular resilient seal member therebetween.

2. A method of assembling a hydraulic seal as claimed in claim 1 in which the annular resilient deformable seal member is a thin sheet metal ring.

3. A method of assembling a hydraulic seal as claimed in claim 1 in which rivets are used in the step of fastening the first and second elongate members of annular cross-section to locate the annular resilient deformable seal member permanently therebetween.

4. A method of assembling a hydraulic seal as claimed in claim 3 further comprising the step of connecting the elongate members of annular cross-section to the inner annular component to maintain the hydraulic seal in position.

5. A method of assembling a hydraulic seal as claimed in claim 1 further comprising the step of providing sealing means on at least one side of the channel in the radially inner surface of the outer annular component to prevent the fluid leaking from the vicinity of the channel when neither the inner nor the outer annular components are rotating.

6. A method of assembling a hydraulic seal as claimed in claim 5 wherein in the step of providing sealing means, at least one of the elongate members of annular cross section is provided with said sealing means to prevent the fluid leaking from the vicinity of the channel when neither the inner nor outer annular components are rotating.

* * * * *